Nov. 3, 1942.  E. C. HORTON ET AL  2,300,571
TIME CONTROLLED SIGNAL RELEASE
Filed June 14, 1938  2 Sheets-Sheet 1
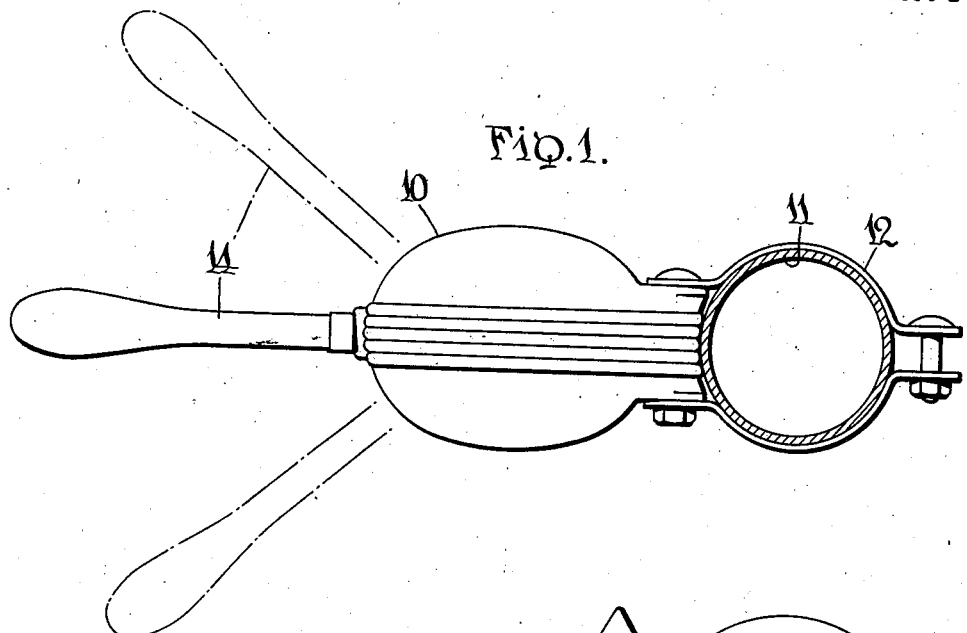
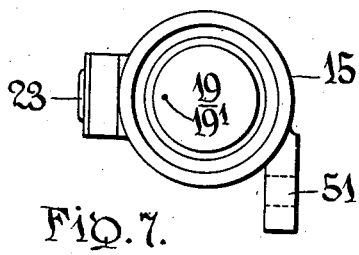
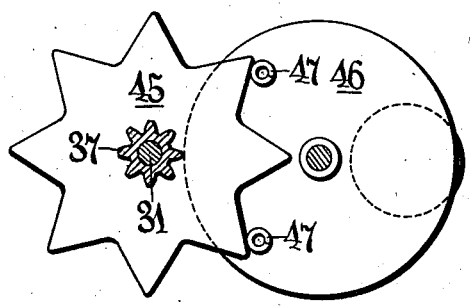
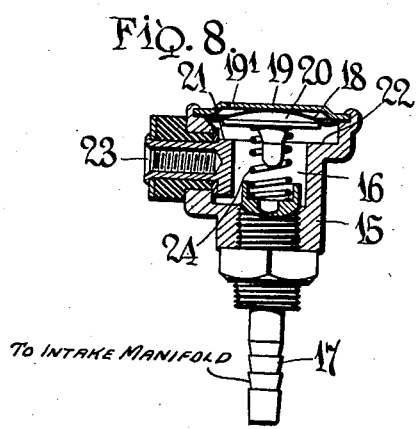
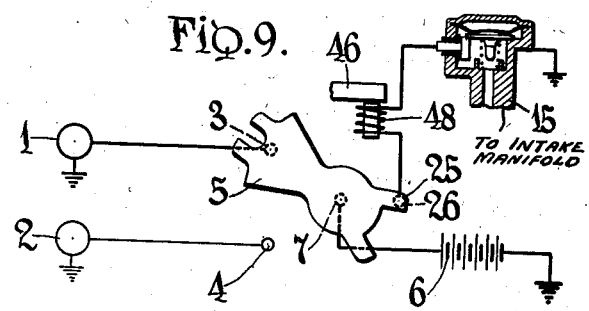
Erwin C. Horton
& Anton Rappl, INVENTORS
BY
Beau, Brooks, Buckley & Beau
ATTORNEYS Nov. 3, 1942.    E. C. HORTON ET AL    2,300,571
TIME CONTROLLED SIGNAL RELEASE
Filed June 14, 1938    2 Sheets—Sheet 2
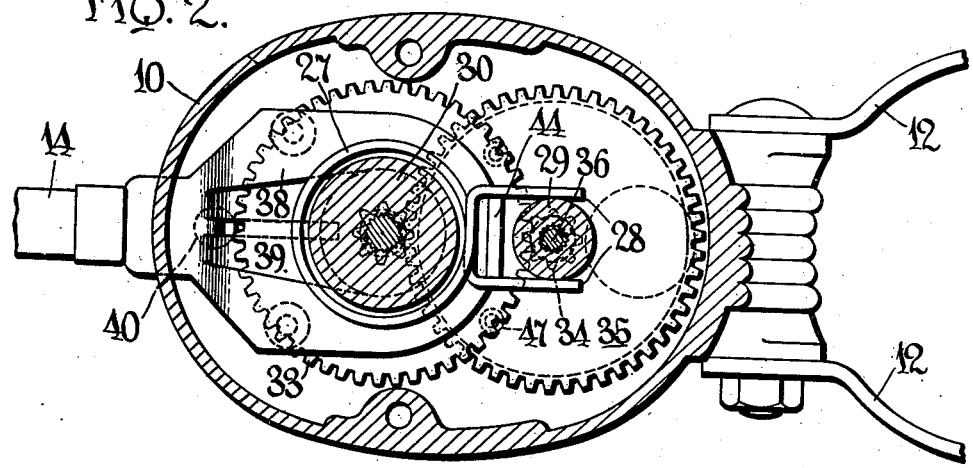
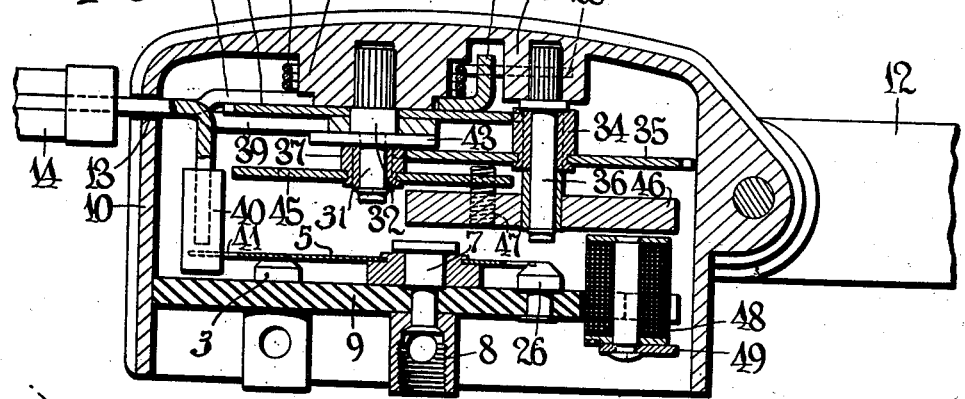
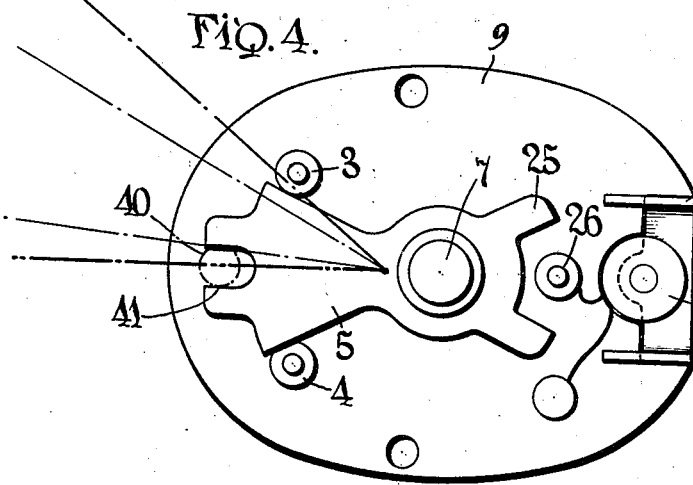
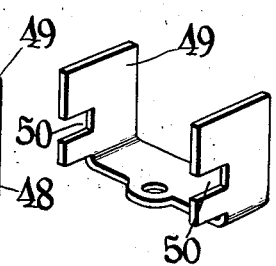
INVENTORS
Erwin C. Horton
BY & Anton Rappl,
Bean, Brooks, Buckley & Bean. ATTORNEYS Patented Nov. 3, 1942

2,300,571

UNITED STATES PATENT OFFICE 2,300,571

TIME CONTROLLED SIGNAL RELEASE

Erwin C. Horton, Hamburg, and Anton Rappl, Eggertsville, N. Y., assignors to Trico Products Corporation, Buffalo, N. Y.

Application June 14, 1938, Serial No. 213,610

10 Claims. (Cl. 177—339)

This invention relates to a direction indicator for motor vehicles and the like and its primary object is to provide a system in which the release of a given signal will depend upon a definite vehicular movement or manipulation and be finally accomplished only after the lapse of a predetermined interval sufficient in duration to give the motorist ample time for executing the signalled manipulation of the vehicle.

The invention further has for its object to provide a signal clearing means for insuring both the retention as well as the release of the given signal in a manner which can be relied upon by the traffic and will, therefore, lend itself to general use by the motoring public.

More particularly the invention resides in a signalling system in which the given signal is retained for a definite period of time in response to a predetermined force which is variable incidental to and during the ordinary operations of the motor vehicle, and is automatically released after the lapse of a predetermined time interval, the beginning of which time interval being determined at will.

In the drawings

Fig. 1 is a top plan view of the control unit for the signalling system;

Fig. 2 is a horizontal section through the control unit;

Fig. 3 is a vertical sectional view thereof;

Fig. 4 is a plan view of the switch detail forming a part of the control unit;

Fig. 5 is a perspective of the frame of the arresting magnet;

Fig. 6 is a fragmentary illustration of the escapement of the control unit;

Fig. 7 is a plan view of the automatic cut-out;

Fig. 8 is a sectional view through the same; and

Fig. 9 is a view depicting the electric wiring diagram.

Referring more particularly to the drawings and especially to the wiring diagram depicted in Fig. 9, the numeral 1 designates the left turn signal of a vehicle and 2 the right turn signal, each being electrically connected to contacts 3 and 4, respectively, of a signal setting switch which has an arm 5 movable to selectively bring either signal member into circuit relation with the battery or other source of electric energy 6 from which the circuit is grounded with the selected signal.

From Fig. 3 it will be observed that the switch member 5 is pivotally mounted on a post 7 having a terminal 8 to which the wire from the electric source is connected, such post being mounted on a supporting base 9 of suitable insulating material. This base serves as a floor or closure for a housing 10 which may be mounted on the steering column 11 by a clamp 12 or otherwise disposed in an accessible position. The housing is formed with a slot 13 to receive a hand lever 14 by which the switch member 5 may be moved in opposite directions from a normal position for its selective circuit closing movements. For instance, if it is desired to make a left turn the handle 14 is swung to the left, or upwardly as viewed in Fig. 1, whereupon the contact 3 is brought into circuit closing relation through the switch member 5 with the battery connected post 7 to energize the signal 1. A reverse movement of the handle from its normal or intermediate position will bring the companion signal 2 into operation.

According to the present invention means are provided to insure the retention of the energized signal in a practical manner, and for accomplishing this purpose it is desired to utilize an influence or force, which is developed by and varies during operation of the motor vehicle, for holding the given signal when the force is of a predetermined value or is within a predetermined range, and for releasing the signal, subject to an interposed time lag, when the force varies from such range, as may be occasioned by the motorist resuming his speed following the consummation of the signalled change. In the embodiment illustrated this retention means comprises an automatic switch (Figs. 7, 8 and 9), a manual switch cooperable with the automatic switch in closing the electric circuit, and a holding device energized to retain a given signal.

The automatic switch is responsive to a varying force, such as the low pressure influence set up in the intake manifold of the motor vehicle engine of the internal combustion type. The automatic switch comprises a body 15 having a chamber 16 connected by a nipple 17 to the intake manifold. The body or casing is preferably metallic for grounding the same with respect to the battery 6. A movable wall in the form of a diaphragm 18 closes one side of the chamber 16 and is responsive to the pressure differential set up by the atmosphere, a protective plate 19 having a vent 19' to the atmosphere. A bridging contact member 20 moves with the diaphragm and is adapted to seat on the shoulders 21 and 22 for closing the circuit thereacross, the shoulder 21 forming a part of an insulated terminal connector 23 while the shoulder 22 may be an integral part of the grounded casing 15. The inward movement of the bridging member 20 is against the urge of a spring 24 which serves to hold the same to the diaphragm and moves the bridging member away from the shoulders when the suction influence in the manifold drops, as when depressing the throttle to accelerate the engine.

It is obvious that at times when the suction influence is within predetermined limits, as when the engine throttle is more or less fully closed, the bridging member 20 will be held down in electrical contact with the shoulders 21 and 22. The retention circuit however, will not be completed or fully closed except upon the motorist cooperating with the automatic switch by manually closing the circuit and this is accomplished herein when the switch member 5 is moved to give a signal, although a separate switch could be employed if desired. The manual switch comprises one or more fingers 25 preferably movable with the member 5 and adapted to engage a contact 26 in electrical connection with the shoulder 21, so that whenever the switch member 5 is moved to close the circuit through a selected signal the retention circuit will also be closed through the contact parts 25 and 26, assuming of course that the bridging member 20 is operatively related to the shoulders 21 and 22, or as soon thereafter as it becomes so operatively related by the motivating force of the power plant or vehicle.

A time lag or delay mechanism cooperates with the automatic cut-out or pressure controlled switch for clearing the signal by restoring the switch member 5 to its normal position after the lapse of a predetermined time interval sufficient in extent to permit the normal execution of the signal change. This timing means is energized by and during the operation which renders the signal operative and in the illustrated embodiment includes a spring motor consisting of a coiled power spring 27 having its opposite terminals 28 freely resting against an interposed boss 29 which may be formed integrally with the housing 10. The spring encircles a boss 30 depending from the ceiling of the housing 10, which boss also serves to anchor a shaft 31 having an enlargement 32 for mounting the hand lever 14. A gear 33 is rotatably supported by the shaft 31 and forms a part of a gear train comprising the gears 34 and 35, journaled on a second depending shaft 36 which latter is conveniently fixed in the boss 29, and a second gear 37 on the shaft 31. The hand lever 14 is of unique design and may be stamped from sheet metal to form upper and lower jaws 38 and 39 which straddle and frictionally embrace the driving gear 33, the frictional embrace being sufficient to constitute a driving connection between the gear and the handle while at the same time permitting slippage of the jaws on the gear when quickly moved in either direction therefrom. A lug is turned downwardly from the sheet metal stock of the hand lever and equipped with an insulating sleeve 40 which extends into the slot 41 of the switch member 5 to provide an operative connection between the two. A wear plate 43 is interposed between the lever 14 and the gear 37 to properly dispose the parts, and the upper jaw 38 of the hand lever is formed with a lug 44 upturned between the spring terminals 28 for moving either one while the companion terminal bears against the boss 29. This torsional movement winds the spring for either clockwise or counterclockwise action.

Referring to Fig. 2, if the hand lever is depressed from its normal full line position, the lug 44 will lift upwardly on the superimposed spring terminal 28 and move it counterclockwise, while the underlying spring terminal 28 will be held by the boss 29. Should the hand lever be moved upwardly, the lug 44 will move the underlying spring terminal downwardly in a clockwise direction, while the overlying spring terminal remains stationary against said boss. During this manual swinging movement the hand lever may slide over the gear 33 without moving the same, especially if it is moved quickly, the primary functions of the lever being to wind the spring and throw the switch members 5. When released, the lever will be returned to its normal position by the displaced spring terminal and acting through the lever and its clamping jaws 38 and 39 will impart movement to the train of gears. Such spring driven action will continue until the displaced spring terminal 28 is restored to its normal position against the boss 29, at which time the part 40 will return the switch member 5 to its neutral position. The spring motor may be directly connected to the switch member otherwise than through part 40 although this arrangement simplifies the construction.

The driving action of the spring 27 is controlled to a practical extent by a governor in the form of an escapement comprising a star wheel 45 fixed to the gear 37 and a weighted disk or wheel 46 journaled on the shaft 36 for free oscillation. This weighted disk is provided with a pair of laterally extending pins or pallets 47 in the form of coil springs for quiet operation, the pallets being so arranged as to permit the star wheel to intermittently move under the impetus of the power spring as its teeth cam alternately against the pallets 47 to effect the oscillatory movement of the weighted disk.

For indefinitely retaining the signal operative means are provided to arrest the time controlled mechanism until such time as will enable the motorist to carry out his indicated change of vehicular travel, and such means is placed under the control of the automatic switch as a part of the retention means. As illustrated, the arresting means embodies an electro-magnet 48 which is interposed in the circuit between the contact shoulder 21 and the switch contact 26 and is so disposed with respect to the weighted disk 46 of the escapement as to magnetically attract and hold the same against movement when the magnet circuit is closed. The magnet has a U-shaped pole piece 49, shown more clearly in Fig. 5, with side notches 50 to fit over the edge of the base piece 9 and thereby position the magnet in proper relation with the disk. The frame or pole piece 49 is held in position by the surrounding housing as well as by pressing the lower sides of the notches into or against the base.

The automatic switch unit, as shown in Figs. 7 and 8 may be mounted by the bracket extension 51 on any suitable part of the chassis to effect the desired ground connection and permit the nipple 15 being connected by suitable tubing, not shown, to the intake manifold.

In operation of the signalling system, the handle 14 is turned right or left depending upon the desired indication to be given. Assuming that a left turn is to be made, the lever 14 is moved to set the switch member 5 in the position indicated in Fig. 9 which closes the circuit through signal 1 and energizes the latter. Concurrently, the finger 25 is engaged with the contact 26 so that if the manifold suction is sufficiently high to render the bridging contact 20 operative, when the suction is sufficiently high to render the automatic switch operative, the retention circuit will immediately close to energize the magnet for holding the time mechanism inoperative. As a rule the manifold suction influence will be sufficient for bringing the bridging contact down on the shoulders 21 and 22 whenever it is desired to give a signalling indication because at such time the motorist is usually slowing down his car, as by closing the engine throttle preliminary to making a turn, and consequently, there will be ample pressure differential to counteract the spring 24. When the handle has been moved to one indicating position and it is desired to change it to the other indicating position, the frictional grip on the driving gear 33 will permit the slippage of the lever thereon without straining or injuring the parts of the spring motor.

Having set the hand lever to operatively dispose the member 5, the magnet becomes effective to hold the escapement against movement, and this retention of the signal will continue until such time as the motorist accelerates his engine by opening the throttle and thereby reducing the pressure differential acting on the diaphragm 18 to such an extent as to permit the spring 24 to function in lifting the bridging contact 20 from the shoulder contacts 21 and 22. If the motorist should release the accelerator pedal again before finger 25 has left the contact 26, the magnet will again become energized to arrest the escapement and hold the signal in its set position. Thus, it is possible for the motorist to momentarily depress his accelerator pedal to continue or increase the motion of his car within certain limits. However, after the lapse of this brief interval the contact finger 25 will ride free of the contact 26 and thereafter the closing of the bridging contact 20 will have no effect on the retention of the signal and the escapement mechanism will operate to restore the hand lever 14 together with the switch member 5 to their normal positions within the prescribed time interval, the switch member riding off its engaged contact 3 or 4 just previous to reaching the normal position. In this connection it should be observed that the contact finger 25 rides free of its contact post 26 prior to the breaking of the signal circuit so that the signal is retained operative for a definite interval subsequent to the release from the holding magnet. This will insure the motorist having ample time to complete the indicated movement.

From the foregoing it will be observed that the signal is set or given through manually controlled means permitting the signal to be pre-set, and that the signal is retained in its set position by the holding means which is responsive to a force set up or developed during vehicle acceleration or other manipulation of the motor vehicle. After the release from said holding means the signal is maintained operative for a substantially definite time interval, as determined by the time controlled mechanism. Obviously the escapement mechanism begins its operation immediately upon release by the electromagnet and continues to operate until the hand lever and switch member are returned to their normal positions unless again arrested by the magnet preliminary to contact finger 25 riding off the contact post 26.

It will be understood further that the apparatus and system described and shown herein are merely illustrative of the inventive principles involved, which may be applied to other physical embodiments without departing from the scope and spirit of the invention claimed. The time delay control per se forms the subject matter of our divisional application Serial No. 410,286, filed September 10, 1941.

We claim:

1. In a direction indicating system for a motor vehicle operated by an internal combustion engine having an intake manifold, in combination with such engine, an indicator, manual means for rendering the indicator operative, a delayed action mechanism operable after a predetermined time interval to restore the indicator to an inoperative condition upon release of the manual means, said delayed action mechanism including a moving part, an electromagnet arranged with the moving part in its magnetic field and adapted to attractively arrest such moving part and thereby hold the mechanism inoperative, and switch means in electric circuit with the electromagnet and responsive to the suction in the intake manifold for closing the circuit when the suction is relatively high and operable to open the circuit when the suction is low thereby to deenergize the magnet and effect the release of the moving part.

2. A direction indicating system for a motor vehicle having a propelling engine, in combination with such engine, an indicator normally inoperative, manual means for rendering the indicator operative, time delay means under the control of said manual means and operable when free to restore the indicator to an inoperative condition at the close of a predetermined interval of time after having been released, electromagnetic means operable to attractively hold the restoring means against functioning and thereby permit the indicator to remain operative indefinitely, and switch means operable upon the throttling of the engine for closing the circuit of said electromagnetic means to render the latter operative and operable upon acceleration of the engine to open the circuit and thereby permit the functioning of said restoring means.

3. In a direction indicating system for a motor vehicle having a power plant in which a variable pressure is developed during operation thereof, in combination with such power plant, a normally inoperative indicator, means for rendering the indicator operative, means for restoring the indicator to an inoperative condition at the close of a predetermined interval of time after having been released, electric means for holding the restoring means from functioning and thereby permitting the indicator to remain operative indefinitely, a circuit including the electric holding means, switch means responsive to a predetermined degree of such developed pressure for closing the circuit of said electric holding means and operable at a different pressure to open the circuit and thereby release said restoring means, and a second switch included in the circuit and operable by said restoring means to open the circuit following the lapse of a part of the predetermined time interval during the operation of such restoring means whereby during this predetermined part only of the time interval the circuit of the holding means may again be closed by a return of the developed pressure to such predetermined degree.

4. A signalling system for motor vehicles of the class described, comprising electrically operable indicating means, a manually closable switch for rendering the indicating means operative, delayed action mechanism energized by the actuation of said switch and operable when free to render the indicating means inoperative at the close of a predetermined interval of time after having been released, electrical holding means adapted to be energized for the arrest of said mechanism, a second switch in circuit with the holding means and adapted to be closed by and during energization of said mechanism, said second switch being operatively related to said mechanism for actuation thereby to an open position for rendering the holding means inoperative after the lapse of the initial portion of the time interval whereby during such inital portion the holding means may again function to arrest said mechanism, a pressure responsive switch in circuit with the second switch and with said holding means, said pressure switch being responsive to the pressure influence in the intake manifold of the vehicle engine to remain closed at maximum suction and to be opened in the presence of a less degree resulting from an open-throttle condition to thereby open the circuit of the holding means.

5. A signalling system for motor vehicles of the class described, comprising electrically operable indicating means, a manually closable switch for rendering the indicating means operative, delayed action mechanism energized by actuation of said manual switch and operable when free to render the indicating means inoperative at the close of a predetermined interval of time after having been released, electrical holding means adapted to be energized for the arrest of said mchanism, a second switch in circuit with the holding means and adapted to be closed by and during energization of said mechanism, said second switch being so arranged and constructed as to remain closed during the initial portion of the time interval during which the mechanism operates whereby said holding means will be adapted to operate for a time after the mechanism has begun to function, a third switch in circuit with the second switch and also with said holding means and operable during engine throttling to cooperate with the second switch in closing the circuit for the holding means, said third switch moving to an open position to break the circuit upon engine acceleration to increase vehicular speed.

6. In a direction indicating system for a motor vehicle having an engine with a manifold in which a variable suction influence is developed during varying operating conditions, in combination with such engine, an indicator, manual means for setting the indicator operative, delayed action mechanism energized by actuation of said manual means and operable when free to render the indicator inoperative at the close of a predetermined interval of time after having been released, and suction controlled holding means responsive to a manifold suction of a predetermined degree for holding the restoring mechanism inoperative, said holding means having a part operable in the absence of such degree of suction to render the holding means inoperative and thereby release the restoring mechanism to function for its time interval and at the close thereof to render the indicator inoperative.

7. In a direction indicating system for a motor vehicle, in combination with the vehicle engine, an indicator, manual means for rendering the indicator operative, delayed action mechanism energized by actuation of said manual means and operable when free for rendering the indicator inoperative at the close of a predetermined interval of time after having been released, means operable upon engine throttling for holding the mechanism inoperative subsequent to the operation of the manual means, and means operable upon engine acceleration to render the holding means inoperative and thereby release the mechanism for its delayed action.

8. In a direction indicating system for a motor vehicle having a power plant in which a variable pressure is developed during normal operation thereof, in combination with the source of such variable pressure, an indicator normally inoperative, manual means for setting the indicator operative, time delay means under the control of said manual means and operable to restore the indicator to an inoperative condition at the close of a predetermined interval of time after having been released, means responsive to a predetermined pressure in the source for holding the restoring means inoperative and operable in the absence of such pressure to release the restoring means for functioning, and means operable by the restoring means following a predetermined preliminary operation of the latter short of such time interval to preclude the re-functioning of said holding means whereby the restoring means may perform its function.

9. A direction indicating system for a motor vehicle having an internal combustion engine with an intake manifold, comprising, in combination with such engine, a pair of indicators, manual means operable in one direction or the other to either of two operative positions for rendering either indicator operative, time delay means energized by said manual means upon movement of the latter in either direction and operable to render the selected indicator inoperative at the close of a predtermined time interval after having been released, means acting upon the delay means for holding the same inoperative and thereby maintaining the selected indicator operative indefinitely, means operatively connecting the manual means to the delay means for permitting movement of the manual means from one operative position to the other in making a reselection of indicators and while the holding means remains operative, and means responsive to a predetermined drop in the manifold suction incidental to engine acceleration for rendering the holding means ineffective whereby the delay means may function to clear the indicator.

10. In a direction indicating system for a motor vehicle having an engine, in combination with such engine, an indicator, a control unit having a switch in circuit with the indicator, a member for closing the switch and thereby rendering the indicator operative, delayed action mechanism under the control of said member and operable at the close of a predetermined time interval after having been released to open the switch, and means responsive to the throttling of the engine for holding the delayed action mechanism inoperative, said holding means bing operable to release the mechanism upon engine acceleration whereby to determine the start of such time interval.

ERWIN C. HORTON.
ANTON RAPPL.